United States Patent [19]

McKinley et al.

[11] 4,158,884
[45] Jun. 19, 1979

[54] GAS TURBINE ENGINE TRIM TEST SET APPARATUS

[75] Inventors: Frederick C. McKinley, Mojave; Ivan R. Anderson, Lancaster, both of Calif.

[73] Assignee: General Electric Company, Lynn, Mass.

[21] Appl. No.: 846,957

[22] Filed: Oct. 31, 1977

[51] Int. Cl.² ................. G06F 11/04; G06F 15/20
[52] U.S. Cl. .................. 364/431; 235/302; 364/580
[58] Field of Search ............. 235/302, 302.1, 304; 364/424, 431, 551, 580

[56] References Cited
U.S. PATENT DOCUMENTS

| | | | |
|---|---|---|---|
| 3,287,965 | 11/1966 | Brahm et al. | 364/431 X |
| 3,485,093 | 12/1969 | Muller et al. | 364/431 X |
| 3,750,465 | 8/1973 | Howell et al. | 364/431 X |
| 3,813,647 | 5/1974 | Loo | 235/302 X |

Primary Examiner—Jerry Smith
Attorney, Agent, or Firm—Henry J. Policinski; Derek P. Lawrence

[57] ABSTRACT

A portable test set provides field measurements of trim adjustable parameters for a gas turbine engine. Analog input signals from sensors disposed about the engine are filtered, to reduce electromagnetic interference, conditioned, amplified, converted to digital form and provided to a microprocessor. The microprocessor uses the digital input signals and stored data to calculate values for measured trim parameters and outputs the results to a digital readout for display. Circuitry is also provided to permit the operator of the test set to input known data to the engine and/or aircraft in order to verify performance of cockpit instrumentation. The test set also may be placed in an internal test mode for verification of its proper performance.

38 Claims, 10 Drawing Figures

GAS TURBINE ENGINE TRIM TEST SET APPARATUS

The invention herein described was made in the course of of under a contract with the United States Air Force.

BACKGROUND OF THE INVENTION

This invention relates to measurement apparatus for gas turbine engines and more particularly to a portable test set for measuring trim adjustable parameters for such engines.

Certain parameters of gas turbine engines require periodic adjustment as part of normal maintenance procedure in order to maintain designed performance levels. Instrumentation for this purpose is generally available at aircraft hangers as part of the ground support equipment. However, due to their large size and lack of compactness such prior art instrumentation is not readily transportable. Another disadvantage of such prior art instrumentation is that it is composed essentially of analog components. These analog components are subject to drift and therefore require frequent calibration. Such prior art instrumentation is also sensitive to electromagnetic interference thereby inhibiting its use in installations such as aircraft carriers where it may be subject to large amounts of interference from radar systems and other sources of electromagnetic energy.

OBJECT OF THE INVENTION

It is the primary object of the present invention to provide a portable test set for making measurements of trim adjustable parameters of a gas turbine engine.

It is another object of this invention to provide a portable test set which has reduced susceptability to electromagnetic interference and which does not require frequent calibration.

It is a further object of this invention to provide a portable test set for measuring the gas generator speed, fan speed, variable guide vane position, and exhaust temperature of a gas turbine engine and also for converting the exhaust temperature and speed measurements to standard day conditions using measured ambient temperature.

It is a further object of this invention to provide a portable test set which includes circuitry to input known data to engine or aircraft mounted detectors in order to permit calibration of cockpit instrumentation.

It is still a further object of this invention to provide a portable test set which may be placed in an internal test mode for verification of proper performance.

SUMMARY OF THE INVENTION

These and other objects of this invention are provided in a portable test set. Analog signals from engine mounted sensors are input to the test set which filters the signals to reduce electromagnetic interference, conditions, amplifies, and converts the signals to digital form and inputs the digital signals to an internal microprocessor. The microprocessor uses the digital input signals and stored data to calculate values for the measured trim parameters and outputs the results to a digital readout for display.

In the preferred embodiment circuitry is provided to measure and display the exhaust gas temperature input to the fuel control, the exhaust gas temperature input to the cockpit, the direct RPM reading of the engine, fan speed, the percentage of rated gas generator speed and variable guide vane position. An analog signal from an ambient temperature sensor is also filtered, amplified, converted to digital and input to the microprocessor. The microprocessor uses the ambient temperature and stored data to correct the speed and temperature measurements to standard day conditions. Controls are provided on the test set to permit either measured or converted standard day values to be displayed and to permit the operator to select which temperature and which speed is desired to be displayed. The test set also includes circuitry which enables the operator to output a signal having a console adjustable voltage level to the exhaust gas temperature input line for the aircraft cockpit instrumentation. This latter circuit permits verification of the proper operation of the cockpit instrumentation. Circuitry and controls are also provided to enable the operator to verify the performance of the test unit and to calibrate the variable guide vane position sensor.

DESCRIPTION OF THE PREFERRED EMBODIMENT

Figure 1:
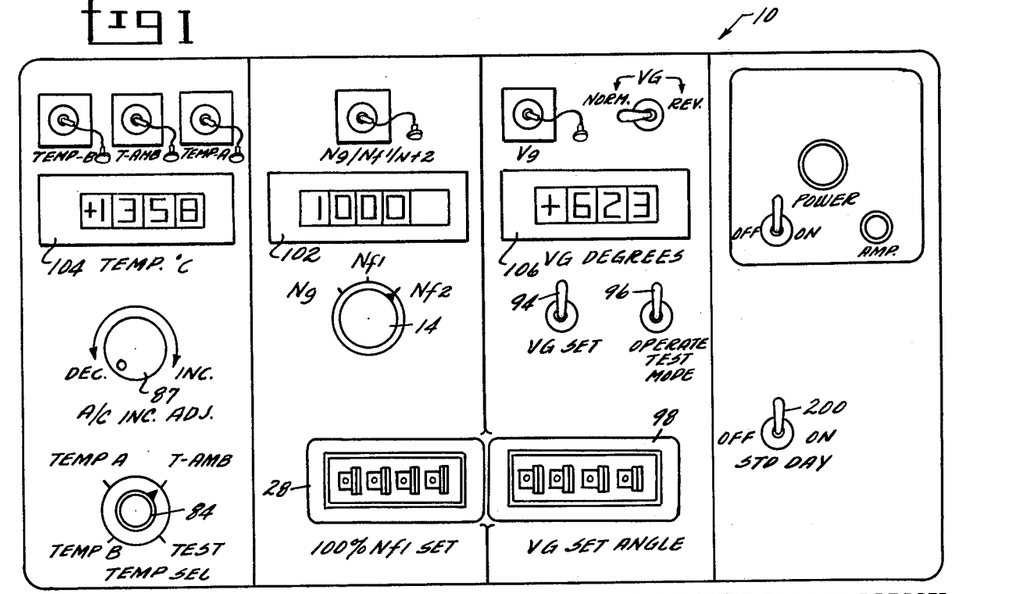
FIG. 1 is a schematic of the console controls for the gas turbine engine trim test set of this invention.
Figure 2:
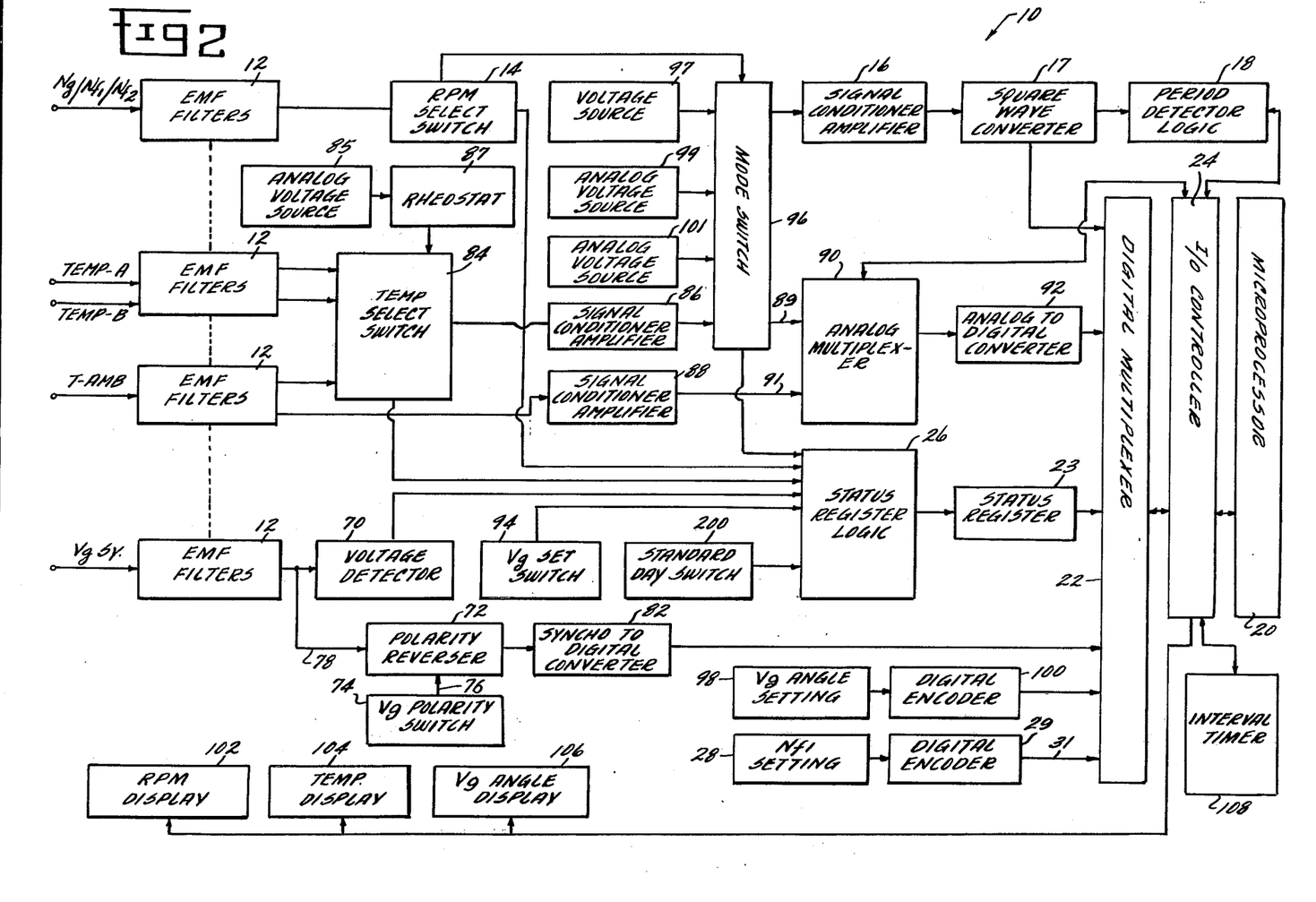
FIG. 2 is a schematic diagram partially in block format illustrating the gas turbine engine trim test set of this invention.

Referring to FIGS. 1 and 2 therein are shown a block diagram partially in schematic format of the gas turbine engine trim test set of this invention. Signals from various analog sensors disposed about a gas turbine engine are input to the trim test set 10. These signals include gas generator speed ($N_g$ or $N_{f1}$), fan speed ($N_{f2}$), variable guide vane position (VG), exhaust gas temperature input to the aircraft cockpit instrumentation (Temp-A), exhaust gas temperature input to the fuel control (Temp-B) and ambient temperature (T-AMB). Each of the measured parameters are input through a bank of electromagnetic filters 12 located within the trim test set 10. Electromagnetic filters 12 are of the kind well known in the art which remove unwanted distortion caused by electromagnetic interference.

Figure 5:
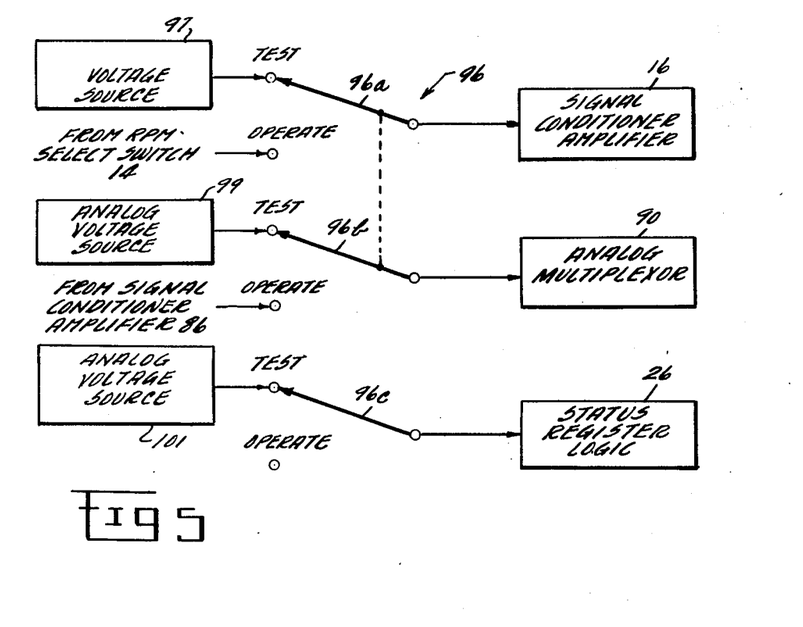
FIG. 5 is a schematic diagram illustrating the mode select switch for the engine trim test set of this invention.
Figure 6:
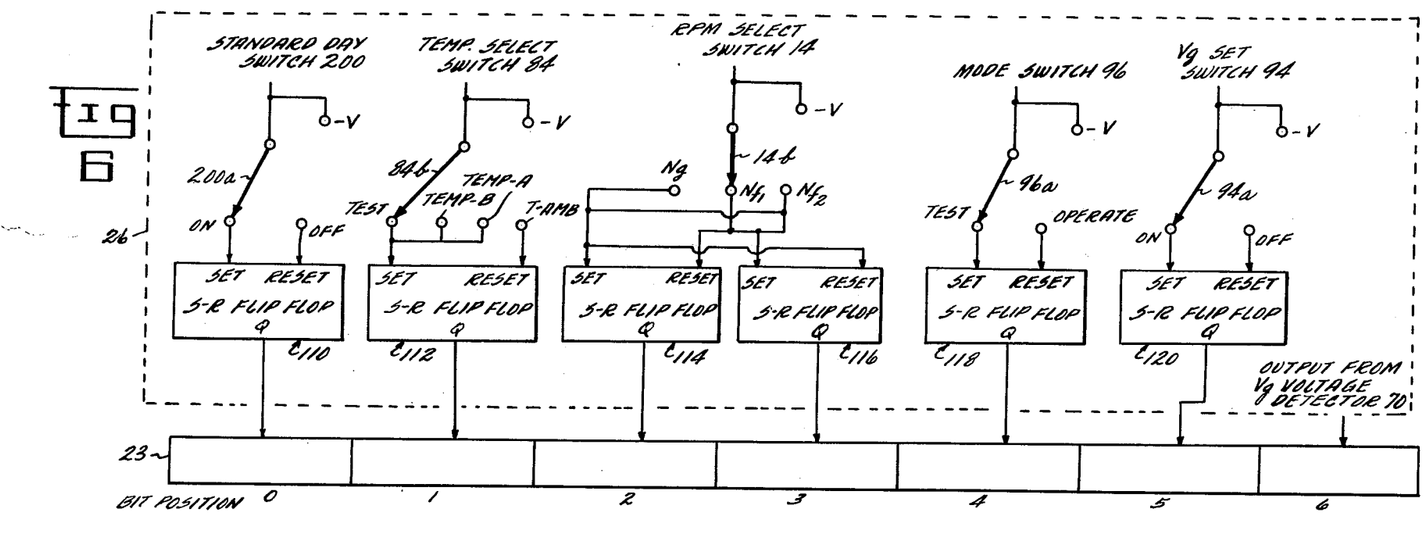
FIG. 6 is a schematic diagram illustrating the status register control logic for the engine trim test set of this invention.

The signal from the engine mounted RPM sensors is an AC signal whose frequency is an analog of the sensed RPM. The sensed gas generator speed signals $N_g$ or $N_{f1}$ or fan speed signals $N_{f2}$ input to the test set, is routed through RPM select switch 14, mode switch 96, signal conditioner amplifier 16, square wave converter 17 and period between logic 18 to the microprocessor 20 via a digital multiplexer 22 interfacing with microprocessor 20 through I/O controller 24. The console mounted mode switch 96 as best seen in FIG. 6 is used to route the selected speed signal to the signal conditioner amplifier 16. When the mode switch 96 is in the OPERATE position the $N_g$, $N_{f1}$ or $N_{f2}$ speed signal input to the trim test set is input to the signal conditioner amplifier 16 through the mode switch 96, the operation of which will be more fully described below. Signal conditioner amplifier 16 is of the type well known in the art which amplifies and conditions the analog input signals for proper interface with square wave converter 17. Square wave converter 17 is of the type well known in the art which converts the received analog frequency input to an output square wave of identical frequency. A console mounted RPM select switch 14 is used to provide an indication to the microprocessor 20 of which speed signal $N_g$, $N_{f1}$ or $N_{f2}$ is being input to the test set. Two gas generator speed settings, $N_g$ and $N_{f1}$, are used in order to provide an indication of whether the frequency represented by the received speed signal input to the trim test set 10 may be converted to RPM using a known standard conversion factor. When the RPM select switch 14 is in the $N_g$ position the frequency of the speed signal input to the trim test set 10 may be converted to % RPM using the standard conversion factor. When the RPM select switch 14 is in the $N_{f1}$ position the calculated % RPM value must be adjusted. A console mounted thumbwheel counter 28, as best seen in FIGS. 1 and 2, is provided to permit the operator to set the amount of correction required. The counter 28 is set to show the speed frequency that corresponds to 100% engine speed. Thus a setting of 70.00 on the thumbwheel counter 28 indicates that the gas generator speed signal received from the engine sensor at 70 HZ corresponds to 100% gas generator speed. The RPM select switch 14, as best seen in FIGS. 5 and 6 is a single pole 3-position switch. Switch arm 14b, which forms part of status register logic 26, is used to set appropriate bits in the status register 23 which is used by the microprocessor 20 to determine the selected speed signal as will be more fully described below.

Figure 3:
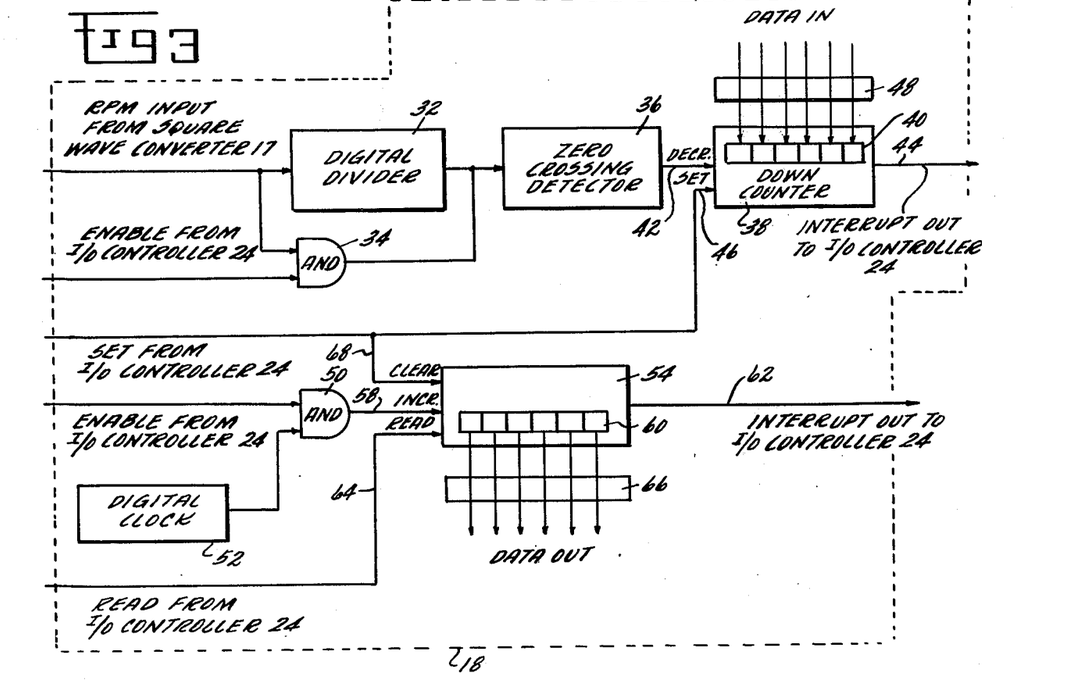
FIG. 3 is a schematic diagram illustrating the period detector logic for the engine trim test set of this invention.

Period detector logic 18, as best seen in FIG. 3, is used to develop a binary representation of the gas generator speed signal received from square wave converter 17. The frequency of the received signal is increased by routing it through a digital divider 32. A bypass circuit under control of the microprocessor 20 is provided to route those RPM input signals of sufficient frequency so as not to require increasing around digital divider 32. The bypass circuit comprises an AND gate 34 across the digital divider 32 which receives an enabling signal from the microprocessor I/O controller 24. The RPM signal is thereafter input to a zero crossing detector 36, well known in the art, which outputs a pulse for each zero crossing of the received square wave. The pulses from zero crossing detector 36 are input to a preset down counter 38, of the type well known in the art, which decrements the count stored in an internal register 40 each time a pulse is received at its input 42 and generates an interrupt on its output line 44 when the internally stored count has been decremented to zero. Pre-set down counter 38 includes a set line 46 which when pulsed, causes data on its data-in lines 48 to be transferred to the internal register 40 and thereafter down counter 38 continues to decrement this new count. The set line 46, output line 44 and data-in lines 48, each communicate with the microprocessor 20 through the I/O controller 24 for purposes which will be more fully described below. Period detector logic 18 also includes a timing circuit for counting the time required to decrement the pre-set down counter 38 to zero. The timing circuit comprises an AND gate 50 which is used to gate the output from a 100 KC digital clock 52 to a digital up-counter 54. The signal from digital clock 52 is gated to the up-counter 54 by an enabling signal from the microprocessor I/O controller on the otherinput line 58 of AND gate 50. Up-counter 54 is of the type well known in the art which develops a digital count of the number of pulses received on its input line 58 in an internal storage register 60. When the stored count exceeds the size of register 60, a pulse is generated on its overflow interrupt line 62. Up-counter 54 also includes a read line 64. A pulse received on the line 64 causes the count stored in the register 60 to be output on the data outlines 66 of the up-counter 54. Up-counter 54 also includes a clear line 68. A pulse received on clear line 68 causes the count in register 60 to be set at zero and thereafter the counting of the pulses received on the line 58 to resume. The clear line 68 of the up-counter 54 and the set line 46 of the pre-set down counter 38 are operated by the same control signal from the microprocessor 20 through I/O controller 24. The microprocessor 20 uses the number of zero crossings input to counter 38 and the time required to make these crossing input from counter 54 to compute the frequency of the received RPM signal, as will be more fully described in connection with the discussion of the operation of the program for the microprocessor 20. In accordance with another feature of this invention, the measured gas generator speed signals $N_g$ and $N_{f1}$ are averaged by the microprocessor 20 for four successive readings in order to provide a more accurate reading. In addition, the measured fan speed $N_{f2}$ is averaged by the microprocessor 20 over a predetermined time period (for example, 4 seconds) prior to display in order to provide a more accurate reading. For this latter purpose an interval timer 108, as best seen in FIG. 2, under control of I/O controller 24 is provided. Interval timer 108 is of the type well known in the art which when receiving an enabling signal on its set line counts down a pre-set time interval and thereafter generates an interrupt pulse on its output line. Both the set and reset lines for the interval timer 108 are controlled by the microprocessor 20 through I/O controller 24.

The variable guide vane position is detected by a VG synchro mounted on the engine. The analog voltage signal from the VG synchro, as best seen in FIG. 2, is input to the bank of electromagnetic filters 12 to a voltage detector 70. The signal from the voltage detector 70 is input to the status register logic 26 in order to set an appropriate bit in the register 23 as will be more fully described below. Voltage detector 70 is of the type well known in the art which maintains a high digital voltage level at its output so long as an AC voltage is detected at its input. The VG synchro signal output from the electromagnetic filters 12 is also input to a polarity reverser 72 under control of the console mounted VG polarity switch 74. Polarity reverser 72 is a phase shifting circuit of the type well known in the art which outputs a signal shifted in phase 180° from the signal received on its input line 78 so long as an enabling signal is received on its control line 76. In this manner when the VG polarity switch 74 is in the reverse position the VG synchro signal will be reversed in polarity. Similarly when the VG polarity switch 74 is in the normal position, the VG synchro signal input to synchro digital converter 82 will not be reversed in polarity. Synchro to digital converter 82 is of the type well known in the art which converts the received AC synchro signal into a digital signal having a binary value proportional to the $V_g$ angle represented by the received VG synchro signal. This binary value is input to the microprocessor 20 through a digital multiplexer 22 and the I/O controller 24, as will be more fully described below.

The trim test set of this invention is also provided with a VG set switch 94, as best seen in FIGS. 1 and 2. The VG set switch 94 is used to calibrate the microprocessor 20 for proper reading of received signals from the engine VG synchro sensor. When placed in the ON position, the VG set switch 94, as best seen in FIG. 6, outputs a digital voltage to the status register logic 26 to set an appropriate bit in the status register 23 for access by the microprocessor 20, as will be more fully described below. With the VG set switch in the ON position, the operator places a known VG angle position signal on the VG synchro input line. This signal is input to the microprocessor 20 via synchro to digital converter 82. The operator also sets the value of this known angle on the console mounted VG angle thumbwheel counter 98, as best seen in FIGS. 1 and 2. The VG angle setting on the console mounted thumbwheel switch 98 is input through a digital encoder 100, digital multiplexer 22 and I/O controller 24 to the microprocessor 20. The microprocessor 20 uses the correlation between the received VG synchro input signal and the operator set VG angle to calibrate VG synchro signals received when the VG set switch 94 is in the OFF position.

Figure 4:
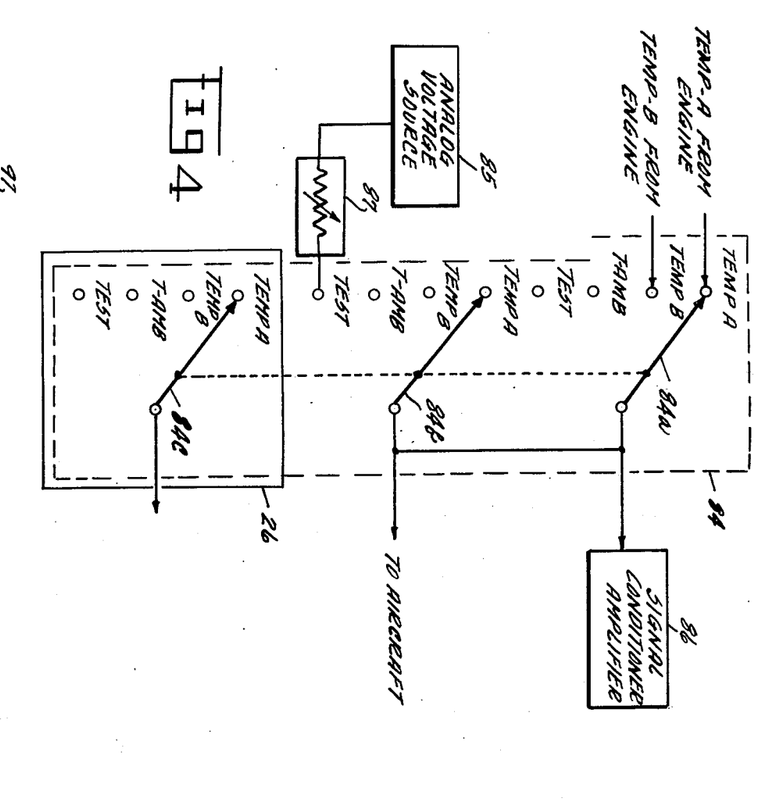
FIG. 4 is a schematic diagram illustrating the temperature select switch for the engine trim test set of this invention.

The signals from the engine mounted sensors for Temp-A, Temp-B, and T-AMB signal are input to the bank of the electromagnetic filters 12 and thereafter into a temperature select switch 84. The console mounted temperature select switch 84, as best seen in FIG. 4, is a 3-pole, 4-position switch. The switch pole 84a is used to route the engine measured Temp-A or Temp-B or an internally generated temperature test signal to a signal conditioner amplifier 86. When the console mounted temperature select switch 84 is in the TEMP-A position, the engined measured TEMP-A signal is routed through the arm 84a to the signal conditioner amplifier 86. When the console mounted temperature select switch 84 is in the TEMP-B position, the engine measured TEMP-B signal is routed through the switch arm 84a to the signal conditioner amplifier 86. The measured T-AMB signal is routed around the temperature select switch 84 to a separate signal conditioner amplifier 88 so as to always be available for access by the microprocessor 20, for purposes which will be more fully described below. The arm 84c of the temperature select switch 84 is used by the status register logic 26 in order to set appropriate bits in the status register 23 used by the microprocessor 20 to determine the selected temperature setting as will be more fully described below. The arm 84b of the temperature select switch 84 is used to route a console adjustable DC analog voltage 85 to the signal conditioner amplifier 86 and to aircraft instrumentation in order to provide a test signal for aircraft instrumentation checkout and to permit calibration between the aircraft temperature indicator and that of the trim test set of this invention. The analog voltage 85 may be operator varied through the use of a console mounted variable rheostat 87 in series with the analog voltage 85. The temperature signal output from signal conditioner amplifier 86 is input to mode switch 96 while the temperature signal output from signal conditioner amplifier 88 is input to analog multiplexer 90. The temperature signals output from the signal conditioner amplifiers 86 and 88 are thereafter accessed by the microprocessor 20 via a channel which includes an analog multiplexer 90, analog to digital converter 92, digital multiplexer 22 and the microprocessor I/O controller 24. Analog multiplexer 90 is of the type well known in the art which under control of the microprocessor 20 selectively routes its received inputs to the analog digital converter 92. Analog to digital converter 92 converts the received analog signals into corresponding digital signals having a value representative of the magnitude of the analog temperature voltage for access by the digital multiplexer 22. Signal conditioner amplifiers 86 and 88 similarly are of the type well known in the art which amplify and condition the received temperature signals.

The console mounted controls for the engine trim test set of this invention also include a mode switch 96. Mode 96, as best seen in FIG. 5, is a 3-pole, 2-position switch. When the mode switch 96 is in the OPERATE position the switch arm 96a is used to transmit the RPM signal input to the test set to the signal conditioner amplifier 16. Similarly, the switch arm 96b is used to transmit the temperature signal output from signal conditioner amplifier 86 to the analog multiplexer 90. Mode switch 96, when in the TEST position, removes the RPM signal input to the test set from the input to signal conditioner amplifier 16 and substitutes therefor an internally generated AC analog RPM signal from a voltage source 97. Switch arm 96a is used for this purpose. Mode switch 96 also when in the TEST position removes the temperature signal output from signal conditioner amplifier 86 from the input to analog multiplexer 90 and substitutes therefor an internally generated AC analog temperature signal from an internal voltage source 99. Mode switch 96 also, when in the TEST position, transmits a digital voltage level from voltage source 101 via switch arm 96c to the status register logic 26.

The console controls for the trim test set of this invention also includes a standard day switch 200. Standard day switch 200, when in the ON position, outputs a digital voltage level to the status register logic 26, as best seen in FIG. 6. When the microprocessor 20 senses that the standard day switch 200 is in the ON position it uses the received ambient temperature value to convert the displayed temperature and RPM values to a standard day condition, as will be more fully described below.

Suitable display devices are provided to display the measured temperature, RPM and VG angle values. Digital solid state readout devices may be used for this purpose. Separate displays 102, 104, and 106 are provided for the measured RPM, temperature and VG angle respectively. These displays are set by the microprocessor 20 through the I/O controller 24.

Referring now to FIG. 6 therein is shown the details of the status register control logic 26 of this invention. The status register 23 is a 7-bit register used by the microprocessor to determine the setting of the console controls. The bit position 0 is used to determine the setting of the standard day switch 200. Bit position 1 is used to determine the position of the temperature select switch 84. The bit positions 2 and 3 are used to determine the setting of the RPM select switch 14. The bit position 4 is used to determine the position of the mode switch 96. The bit position 5 is used to determine the position of the VG set switch 94. The bit position 6 is used to determine whether a VG synchro signal is being received by the voltage detector 70.

Figure 7:
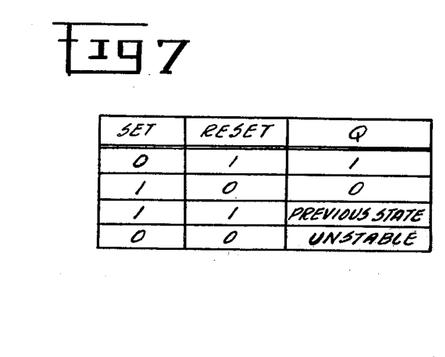
FIG. 7 is a truth table for an S/R flip flop used in the engine trim test set of this invention.

Status register control logic 26 uses several S/R flip flops of the type well known in the art in which the digital value at its output Q changes in accordance with the digital value at its set and reset inputs as best seen in the truth table of FIG. 7. The S/R flip flops used in status register logic 26 are preferably TTL logic devices in which an open circuit condition at either the reset or set terminals is equivalent to a binary 1.

When the standard day switch 200 is in the ON position a voltage level is provided through the switch arm 200a to the set terminal of an S/R flip flop 110 causing its Q output to go high. Similarly when the standard day switch 200 is in the OFF position a voltage level +V is provided through the switch arm 200a to the reset terminal of the S/R flip flop 110 causing its Q output to go to 0. The output of S/R flip flop 110 is connected to the bit 0 position of status register 23. In this manner, a one in the bit 0 position of status register 23 indicates that the standard day switch 200 is in the ON position. Similarly, a 0 in the bit 0 position of status register 23 indicates the standard day switch 100 is in the OFF position.

When the temperature select switch 84 is in either the Test, Temp-B or Temp-A positions a voltage level −V is provided through the switch arm 84b to the set terminal of an S/R flip flop 112. This voltage level causes the 0 output of S/R flip flop 112 to go high. Similarly, when the temperature select switch 84b is placed in the T-AMB position, a voltage level −V is provided through the switch arm 84b to the reset terminal of S/R flip flop 112 causing its Q output to return to 0. The Q output of S/R flip flop 112 is connected to the bit 1 position of status register 23. In this manner, a 1 in the bit 1 position of status register 23 indicates that the operator has selected the temperature input to the signal conditioner amplifier 86 for display. Similarly, a 0 in the bit 1 position of the status register 23 indicates that the operator has selected the measured T-AMB signal output from signal conditioner amplifier 88 for display.

Figure 8:
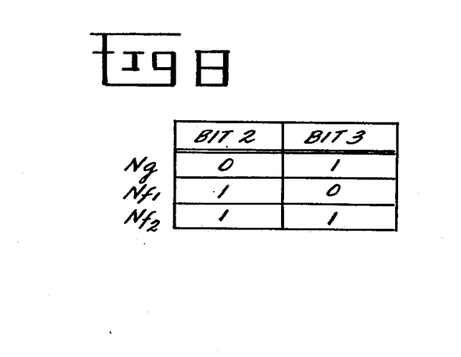
FIG. 8 is a truth table for the bit 2 and bit 3 positions of the status register for the engine trim test set of this invention.

Two S/R flip flops 114 and 116 are used to encode the bit 2 and bit 3 positions of status register 23 to indicate the setting of the RPM select switch 14. The $N_g$ terminal of RPM select switch 14 is connected to the set terminal of an S/R flip flop 114 and to the reset terminal of an S/R flip flop 116. Similarly, the $N_{f1}$ terminal of RPM select switch 14 is connect to the reset terminal of S/R flip flop 114 and to the set terminal of S/R flip flop 116. The $N_{f2}$ terminal of RPM select switch 14 is connected to the set terminal of S/R flip flop 114 and to the set terminal of S/R flip flop 116. Thus when the RPM select switch 14 is placed in the $N_g$ position a voltage level −V is provided through the switch arm 14b to the set terminal of S/R flip flop 114 and to the reset terminal of S/R flip flop 116 causing the Q outputs of S/R flip flops 114 and 116 to assume the values of 0 and 1 respectively, resulting in corresponding values in the bit 2 and bit 3 positions of status register 23, as best seen in FIG. 8. When the RPM select switch 14 is placed in the $N_{f1}$ position a voltage level −V is provided through the switch arm 14b to the set terminal of S/R flip flop 114 and to the reset terminal of S/R flip flop 116. This causes the Q outputs of S/R flip flops 114 and 116 to assume the values of 1 and 0 respectively, resulting in corresponding values in the bit 2 and 3 positions of status register 24, as best seen in FIG. 8. When the RPM select switch 14 is placed in the $N_{f2}$ position a voltage level is provided through the switch arm 14b to the set terminal of S/R flip flop 116. This causes the Q outputs of S/R flip flops 114 and 116 to both assume a digital 1 value and corresponding values in the bit 2 and bit 3 positions of status register 23 as best seen in FIG. 8. In this manner the microprocessor 20 is able to ascertain the selected RPM signal to be displayed.

When the mode switch 96 is in the TEST position a voltage level −V is provided through the switch arm 96a to the set terminal of an S/R flip flop 118 causing its Q output to go high to thereby set a 1 in the bit 4 position of status register 23. Similarly, when the mode switch 96 is in the OPERATE position a voltage level −V is transmitted through the switch arm 96a to the reset terminal of S/R flip flop 118 causing its Q output to return to 0 thereby setting a 0 in the bit 4 position of status register 23. In this manner a 1 in the bit 4 position of status register 23 indicates that the mode switch 96 is in the TEST position. Similarly, a 0 in the bit 4 position of status register 23 indicates that the mode switch 96 is in the OPERATE position.

When the VG set switch 94 is in the ON position a voltage level −V is provided through the switch arm 94a to the set terminal of an S/R flip flop 120, causing its Q output to go high. Similarly, when the VG set switch is in the OFF position a voltage level −V is provided through the switch arm 94a to the reset terminal of S/R flip flop 120 causing its Q output to go to 0. The Q output of S/R flip flop 120 is connected to the bit 5 position of status register 23. In this manner a 1 in the bit 5 position of status register 23 indicates that the VG set switch 94 is in the ON position. Similarly, a 0 in the bit 5 position of status register 23 indicates that the VG set switch 94 is in the OFF position.

The output of the voltage detector 70 is connected directly to the bit 6 position of status register 23. Voltage detector 70 outputs a voltage level −V while a signal is being detected on the input line from the engine VG synchro sensor. When no VG sensor signal is being received the output of voltage detector 70 goes high resulting in a 0 in the bit 6 position of status register 23. In this manner, a 1 in the bit 6 position of status register 23 indicates that a VG synchro signal is being received from the engine VG synchro sensor. Similarly, a 0 in the bit 6 position of status register 23 indicates that no VG synchro signal is being received from the engine VG synchro sensor. Status register 23 is accessed by the microprocessor 20 through the digital multiplexer 22 and microprocessor I/O controller 24.

The microprocessor I/O controller interface includes an interrupt register (not shown) by which the I/O controller 24 alerts the microprocessor to which externally connected device has generated an interrupt. Any commercially available general or special purpose digital computer with associated input-output circuitry may be used for the microprocessor 20 and its associated I/O controller 24. Such devices are well known in the art and the details thereof do not form a part of this invention. Similarly, digital multiplexer 22, analog multiplexer 90, analog to digital converter 92 and digital encoders 29 and 100 are commercially available devices, the details of which do not form a part of this invention.

Figure 9A:
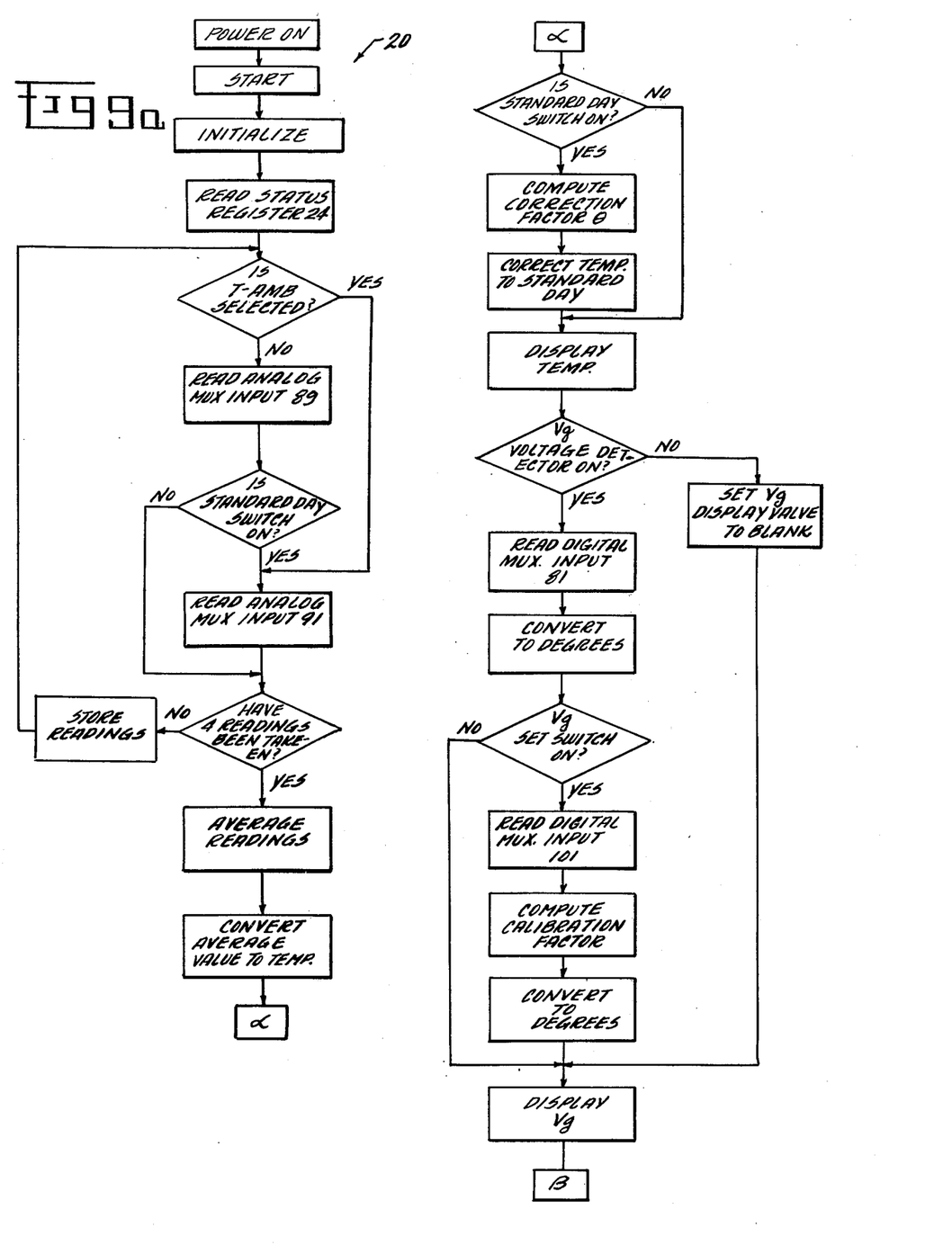
FIGS. 9(a) and 9(b) are flow diagrams for a computer program used in the microprocessor for the engine trim test set of this invention.
Figure 9B:
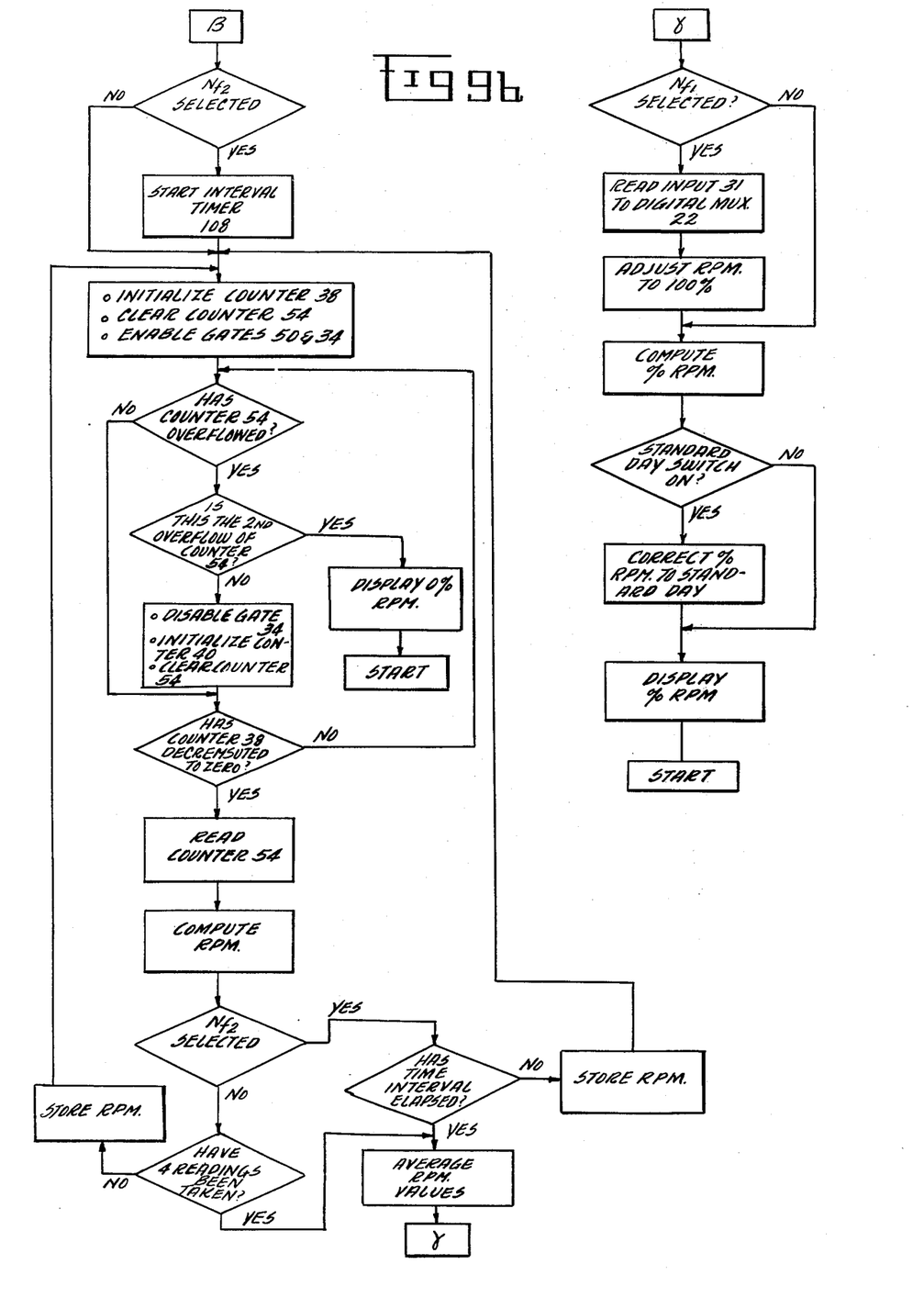

Referring now to FIG. 9 therein is shown a flow diagram for a computer program for the microprocessor 20. The microprocessor is initialized upon turning on power to the trim test set 10. This causes the program to initialize all internal and external registers and thereafter to read the status register 23. The status register 23 is initially examined to determine whether T-AMB has been selected. If T-AMB has not been selected the microprocessor reads analog multiplexer input 89 which will contain the selected Temp-A, Temp-B, Test temperature from voltage source 99 or the Test temperature from the voltage source 85. The microprocessor thereafter examines the status register 23 to determine whether the standard day switch 200 is in the ON position. If either the standard day switch 200 is in the ON position or T-AMB has been selected the microprocessor will read analog multiplexer input 91 which corresponds to the measured T-AMB signal. This process is repeated until a total of four successive temperature readings have been accumulated. The measured temperature signals are averaged. The microprocessor uses this average value and stored data to compute a temperature value for display according to the following stored formula:

Temperature in °C. = Average digital value in volts$\times K_1$°C./Volt

Where: $K_1$ is a stored constant determined by the sensitivity of the temperature sensor used.

Thereafter the microprocessor examines the status register 23 to determine whether the standard day switch 200 is in the ON position. If the standard day switch 200 is in the ON position the microprocessor will use the measured T-AMB value to compute a correction factor to convert the temperature reading to a standard day condition. The microprocessor uses internally stored formulas for this purpose which may be represented by the following equations:

$\theta$ = Correction Factor = 
$$\frac{\text{measured amb. temp. in degrees centigrade (°C.)} + 273.16}{288.16}$$

Corrected Temp. =

$$\left( \frac{\text{measured temp. in degrees centigrade (°C.)} + 273.16}{\theta} \right) - 273.16$$

Thereafter the temperature is displayed on the digital readout display 104.

The microprocessor then examines the status register 23 to determine whether a VG synchro signal is being received by voltage detector 70. If no VG signal is being received the microprocessor will output a blank to the VG readout display 106. If the voltage detector 70 is detecting a VG synchro input, the microprocessor 20 will read the digital multiplexer input 91 which corresponds to the sensed VG value. The microprocessor uses this value and stored data to compute the $V_g$ angle according to the following stored formula:

$V_g$ Angle in degrees = Digital value in volts$\times K_2$ degrees/Volt+$K_3$ where:
$K_2$ is a stored constant determined by the sensitivity of the $V_g$ synchro used.
$K_3$ is an internally stored calibration factor.

Thereafter the microprocessor 20 will examine the status register 23 to determine whether the VG set switch is in the ON position. If the VG set switch is in the ON position the microprocessor reads digital multiplexer input 91 which corresponds to the encoded value for the VG angle setting which has been set by the operator. This setting is used to calibrate all future measured VG angle positions and to adjust the current measured VG angle by adjusting the value of $K_3$. Thereafter the VG angle is displayed on the digital readout 106.

Thereafter, the microprocessor 20 examines the status register 23 to determine whether $N_{f2}$ has been selected. If it has, the interval timer 108 is started. Thereafter the microprocessor 20 initializes the counter 40 by transmitting a predetermined binary value to be decremented, clears counter 54 to 0, and enables the gates 50 and 34 to permit measuring of the frequency of the received RPM input. When an overflow interrupt signal is received on line 62 from the up-counter 54, the microprocessor will disable the gate 34 to enable the digital divider 32 to increase the frequency of the RPM signal input to the detector logic 18. If an overflow interrupt is generated by the counter 54 after gate 34 has been disabled but before counter 38 has decremented to zero, then the received RPM signal has a frequency too low to be measured and the microprocessor will display a zero value on the % RPM display. When the down-counter 38 has decremented to zero the microprocessor will receive an interrupt from the down-counter interrupter line 44 and upon receipt thereof will read the counter 54, and compute the RPM value according to the following stored formula:

RPM = 
$$\frac{\text{(Number of zero crossings preset into down-counter 38)} \times (60 \times 100,000) \times K_4}{\text{Count from up-counter 54}}$$

where $K_4$=1 if AND gate 34 is enable or a stored constant determined by the amount of division performed by digital divider 32 if AND gate 34 is disabled.

The microprocessor will then examine the status register 23 to determine whether $N_{f2}$ has been selected. If $N_{f2}$ has been selected the microprocessor 20 will continue to accumulate measured $N_{f2}$ values until an interrupt from the interval timer 108 has been received. Thereafter the microprocessor computes an average of these accumulated values. If $N_{f2}$ has not been selected the microprocessor accumulates four successive values of the selected RPM input and then computes an average of these values. The microprocessor averages these values to get a more reliable % RPM for display. The microprocessor then examines the status register 23 to determine whether $N_{f1}$ has been selected. If $N_{f1}$ has not been selected then the calculated RPM value corresponds to 100% RPM. If $N_{f1}$ has been selected the microprocessor will read input 31 to digital multiplexer 22 which corresponds to the encoded setting of thumbwheel switches 28. The microprocessor uses this value to adjust the averaged RPM value to 100%. The microprocessor then examines the status register to determine whether the standard day switch 200 is in the ON position. If it is, the microprocessor uses the computed correction factor $\theta$ to convert the averaged RPM value to standard conditions according to the following stored formula:

RPM Corrected = RPM measured/$\sqrt{\theta}$

The microprocessor 20 uses the corrected or uncorrected RPM value and stored data to compute to %RPM/RPM value for display according to the following stored formula:

%RPM/RPM = RPM measured/RPM rated

Where: RPM is a stored constant representing the rated engine speed
The microprocessor thereafter displays the adjusted or unadjusted value of the % RPM on display 102. The microprocessor then returns to the start of the program, repeating the entire procedure.

Various changes could be made in the structures shown in FIGS. 1 through 9 without departing from the scope of the invention; For example, the trim test set of this engine with slight modification, could be used to measure and display performance parameters of a gas turbine engine other than those specifically listed above, such as inlet throat gas velocity, variable turbine nozzle position, etc. Further, while the several of the parameters of the preferred embodiment are alternative, several of these, i.e. ($N_g$ and $N_{f2}$) may be simultaneously processed by using additional sensing and processing elements.

Therefore, having described a preferred embodiment of the invention, though not exhaustive of all possible equivalents, what is desired to be secured by Letters Patent of the United States is claimed below:

1. A test set for measuring and displaying performance parameters of a gas turbine engine comprising:
   (a) a plurality of terminal means, each adapted to receive the analog signal from a separate performance parameter sensor, each analog signal having a value representative of the value of a corresponding performance parameter;
   (b) square wave converter means for converting received analog signals into corresponding square waves each having a frequency indicative of the value represented by its corresponding analog signal;
   (c) period detector logic means for receiving said square waves and outputting corresponding digital signals, each having a value indicative of its corresponding square wave;
   (d) processor means for receiving the digital signals and calculating the value of their corresponding performance parameters; and
   (e) display means for displaying the calculated performance parameter.

2. The test set of claim 1 further comprising filter means for reducing distortion to said analog signals caused by electromagnetic interference with said analog signals.

3. The test set of claim 1 further comprising operator controlled means internal to said test set for generating analog test signals to said converter means to verify proper operation of the test set.

4. The test set of claim 1 further comprising an operator control panel.

5. The test set of claim 1 further comprising means for generating operator variable test signals to instrumentation external to said test set to verify the proper operation of said instrumentation.

6. The test set of claim 5 wherein said display means displays the value of said operator variable test signals.

7. The test set of claim 1 further comprising operator controlled multi-position switch means for selecting alternate groups of said performance parameters for display.

8. The test set of claim 7 wherein said performance parameters comprise gas generator speed and fan speed.

9. The test set of claim 8 wherein said switch means includes operator selectable positions corresponding to uncorrected gas generator speed (Ng), corrected gas generator speed ($N_{f1}$), and fan speed ($N_{f2}$).

10. The test set of claim 9 wherein the calculated parameter value for Ng is an average of a predetermined number of separately sensed Ng values.

11. The test set of claim 9 wherein the calculated parameter value for $N_{f1}$ is an average of a predetermined number of separately sensed $N_{f1}$ values.

12. The test set of claim 9 wherein the calculated value for $N_{f2}$ is an average of a plurality of separately sensed $N_{f2}$ values occurring within a predetermined time period.

13. The test set of claim 9 wherein said switch means further includes a Test Mode position and when therein causes an analog test signal of known value to be input to said square wave converter means whereby proper operation of the test set may be verified by determining whether the displayed speed value equals the known speed value corresponding to said analog test signal.

14. The test set of claim 9 wherein said sense parameters further includes ambient temperature (T-AMB).

15. The test set of claim 14 wherein said switch means includes an operator selectable position in which an indication is transmitted to said processor means that the sensed speed parameters are to be corrected to a standard day condition.

16. The test set of claim 15 wherein the processor means in response to selection of the standard day correction position of the switch means uses T-AMB to convert received speed parameter values to corresponding standard day speed parameter values.

17. The test set of claim 16 wherein the processor means uses the following stored formula to convert received speed parameter values to corresponding standard day speed parameter values:

$$\text{Corrected RPM} = \frac{\text{sensed RPM}}{\sqrt{\theta}}$$

$$\text{where } \theta = \frac{\text{T-AMB in degrees centigrade} + 273.16}{288.16}$$

18. The test set of claim 9 further comprising a set of operator controlled thumbwheel switches for setting the amount of correction required to the sensed gas generator speed when the switch means is in the $N_{f1}$ position.

19. The test set of claim 18 wherein the processor means uses the operator set correction to correct the sensed gas generator speed for display by said display means.

20. The test set of claim 1 wherein said performance parameters include engine exhaust gas temperature input to the engine fuel control (TEMP-B), engine exhaust gas temperature input to aircraft instrumentation (TEMP-A) and ambient temperature (T-AMB).

21. The test set of claim 20 wherein said converter means comprises:
   analog to digital converter means for converting sensed analog temperature signals into corresponding digital signals having a value indicative of the sensed temperature.

22. The test set of claim 21 wherein said switch means includes operator selectable positions corresponding to TEMP-A, TEMP-B and T-AMB and TEST.

23. The test set of claim 22 further comprising analog voltage source means for inputting an operator variable analog voltage to said analog to digital converter means when said switch means is in the TEST position whereby a simulated analog temperature signal may be transmitted to said processor means and displayed by said display means.

24. The test set of claim 23 further comprising terminal means for transmitting said operator variable analog voltage external to the test set whereby the simulated analog temperature signal may be transmitted to aircraft instrumentation for testing thereof.

25. The test set of claim 21 wherein said switch means further includes a Test Mode position and when therein causes an analog test signal of known value to be input to said analog to digital converter means whereby proper operation of the test set may be verified by determining whether the displayed temperature value equals the known temperature value corresponding to said analog test signal.

26. The test set of claim 21 wherein said switch means includes an operator selectable position in which an indication is transmitted to said processor means that the sensed parameters are to be corrected to a standard day condition.

27. The test set of claim 26 wherein the processor means in response to selection of the standard day correction position of the switch means uses the sensed T-AMB value to convert received temperature values to corresponding standard day temperature values.

28. The test set of claim 27 wherein the processor means uses the following stored formula to convert received temperature parameter value to corresponding standard day values:

$$\text{Standard day temperature in degrees centigrade} = \frac{\text{sensed temperature in degrees centigrade} + 273.16}{\theta} - 273.16$$

$$\text{where } \theta = \frac{T_{AMB} \text{ in degrees centigrade} + 273.16}{288.16}$$

29. The test set of claim 20 wherein the calculated parameter value for TEMP-A, TEMP-B, and T-AMB is an average of a predetermined number of separately sensed values therefor.

30. The test set of claim 1 wherein said performance parameters include variable guide vane position ($V_g$).

31. The test set of claim 1 wherein said performance parameters include corrected gas generator speed ($N_{f1}$), uncorrected gas generator speed ($N_g$), fan speed ($N_{f2}$), exhaust gas temperature input to the fuel control (TEMP-A), exhaust gas temperature input to aircraft instrumentation (TEMP-B), ambient temperature (T-AMB), and variable guide vane position ($V_g$).

32. A test set for measuring and displaying performance parameters of a gas turbine engine comprising:
(a) a plurality of terminal means, each adapted to receive the analog output of a separate performance parameter sensor one of said parameters comprising variable guide vane position (Vg);
(b) converter means for converting received analog signals to digital signals each having a value representative of the value of a corresponding performance parameter;
(c) processor means for receiving the digital signals and calculating the values of their corresponding performance parameters;
(d) display means for displaying the calculated performance parameter values; and
(e) voltage detector means for detecting the presence of Vg signals at said terminal means and outputting a signal to said processor means indicative of whether Vg signals are present at said terminal means.

33. The test set of claim 32 wherein said processor means outputs a value which causes the display means to display a blank for the variable guide vane position when said processor means receives an indication from said voltage detector means that no $V_g$ signals are present at said terminal means.

34. A test set for measuring and displaying performance parameters of a gas turbine engine comprising:
(a) a plurality of terminal means, each adapted to receive the analog output of a separate performance parameter sensor one of said parameters comprising variable guide vane position (Vg);
(b) converter means for converting received analog signals to digital signals each having a value representative of the value of a corresponding performance parameter;
(c) processor means for receiving the digital signals and calculating the values of their corresponding performance parameters;
(d) display means for displaying the calculated performance parameter values; and
(e) operator selectable polarity reverser means for shifting the phase of received Vg signals.

35. A test set for measuring and displaying performance parameters of a gas turbine engine comprising:
(a) a plurality of terminal means, each adapted to receive the analog output of a separate performance parameter sensor one of said parameters comprising variable guide vane position (Vg);
(b) converter means for converting received analog signals to digital signals each having a value representative of the value of a corresponding performance parameter;
(c) processor means for receiving the digital signals and calculating the values of their corresponding performance parameters;
(d) display means for displaying the calculated performance parameter values; and
(e) operator controlled multi-position switch means for selecting alternate groups of said performance parameters for display, said switch means including an operator selectable Vg set position which when therein causes the Vg angle represented by the setting of a plurality of operator controlled thumb wheel switches to be displayed by said display means.

36. The test set of claim 35 wherein said processor means uses the $V_g$ angle represented by the setting of said thumbwheel switches and the value of $V_g$ position signals received while said switch means is in the $V_g$ set position to compute a calibration factor to be used to compute the value of $V_g$ position signals received when said switch means is not in the $V_g$ position.

37. A test set for measuring and displaying performance parameters of a gas turbine engine comprising:
(a) a plurality of terminal means, each adapted to receive the analog output of a separate performance parameter sensor one of said parameters comprising variable guide vane position (Vg);

(b) synchro to digital converter means for converting received variable guide vane position signals into corresponding digital signals each having a value indicative of the value of its corresponding variable guide vane position signal;

(c) processor means for receiving the digital signals and calculating the values of their corresponding performance parameters; and (d) display means for displaying the calculated performance parameter values.

38. A test set for measuring and displaying performance parameters of a gas turbine engine comprising:

(a) a plurality of terminal means, each adapted to receive the analog output of a separate performance parameter, said parameters including engine exhaust gas temperature input to the engine fuel control (TEMP-B), engine exhaust gas temperature input to aircraft instrumentation (TEMP-A) and ambient temperature (T-AMB);

(b) analog to digital converter means for converting sensed analog temperature signals into corresponding digital signals having a value indicative of the sensed temperature;

(c) processor means for receiving the digital signals and calculating the value of the corresponding temperature parameter;

(d) display means for displaying the calculated value;

(e) operator controlled multi-position switch means for selecting alternate groups of said parameters for display, said switch means including operator selectable positions corresponding to TEMP-A, TEMP-B, T-AMB, and TEST;

(f) analog voltage source means for inputting an operator variable voltage to said converter means when said switch means is in the TEST position whereby a simulated analog temperature signal may be transmitted to said processor means and displayed by said display means.

* * * * *